United States Patent [19]

Meiring

[11] Patent Number: 4,509,609
[45] Date of Patent: Apr. 9, 1985

[54] WEIGHBELT APPARATUS

[75] Inventor: Willem J. Meiring, Stellenbosch, South Africa

[73] Assignee: Tobacco Research & Development Institute Limited, Zug, Switzerland

[21] Appl. No.: 517,822

[22] Filed: Jul. 27, 1983

[30] Foreign Application Priority Data

Sep. 23, 1982 [ZA] South Africa ............... 82/6993

[51] Int. Cl.³ .................. G01G 9/00; G01G 23/01; G01G 23/14
[52] U.S. Cl. ........................................ 177/1; 177/50; 177/151; 177/165; 73/1 B
[58] Field of Search ............... 177/50, 151, 164, 165, 177/1; 73/1 B

[56] References Cited

U.S. PATENT DOCUMENTS 3,180,475  4/1965  Del Rosso ............... 177/50
3,656,337  4/1972  McDonald ............ 177/50 X
3,850,023  11/1974  McDonald ............ 73/1 B
4,392,535  7/1983  Fujii et al. ............. 177/165 X Primary Examiner—E. A. Goldberg
Assistant Examiner—Patrick W. Foster
Attorney, Agent, or Firm—Scully, Scott, Murphy and Presser

[57] ABSTRACT

A weighbelt is conventionally placed in or associated with a production line for weighing material supplied during production. The weighbelt of the invention has a belt 10 which can be lifted by rollers 18 out of contact with a planar support plate 16 without stopping the belt 10. A known mass 24 is then lowered into a cradle 26 to provide a downward force on the plate 16 to calibrate output signals of a strain gauge 22. The strain gauge 22 provides output signals when the belt is supported by the plate 16 indicative of the material loading on the belt 10. The weighbelt can be calibrated without stopping the belt 10 and disrupting production.

14 Claims, 2 Drawing Figures

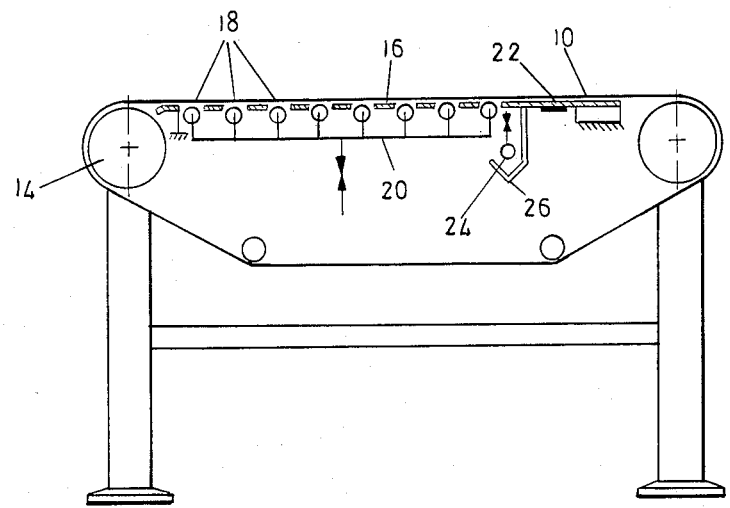
FIG_1
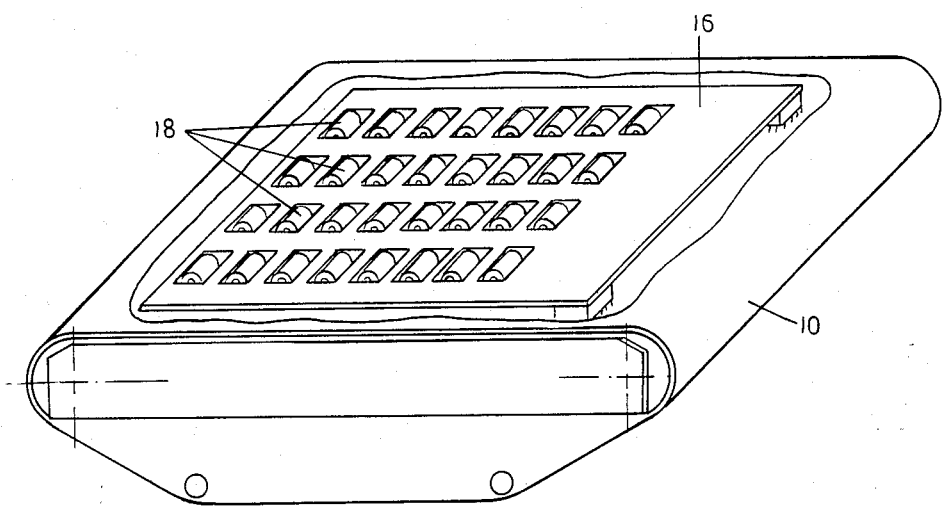
FIG_2

WEIGHBELT APPARATUS

BACKGROUND OF THE INVENTION

The invention relates to weighbelt apparatus.

Weighbelt apparatuses are used especially in production flow lines to determine the mass of a material passing a particular point. The material is supported and carried by the weighbelt, normally placed in a flow or feed line, and the mass flowing is determined by measuring the mass on the weighbelt at a particular instance in time and the speed of the belt.

Difficulties arise in calibrating the weighbelt and especially in ensuring that the calibration does not alter. If such calibration requires complete stoppage of the flow of materials considerable production time can be lost.

It is an object of the invention to at least reduce these difficulties.

SUMMARY OF THE INVENTION

According to the invention there is provided a weighbelt apparatus comprising a generally planar support for the belt, measuring means arranged to determine the condition of the support indicative of the force applied to the support by the belt, including means for lifting the belt out of contact with the support during operation of the apparatus and applying a known force to the support to enable the measuring means to be calibrated from time to time without interupting the use of the apparatus.

Preferably, the apparatus is also arranged to record a measurement corresponding to the effective mass of the belt when the belt is unloaded so that this measurement can be substracted automatically to determine the mass of material on the belt during loaded operation of the belt.

The apparatus can include an electrical circuit arrangement arranged to monitor the measuring means and to control the means for lifting the belt during the calibration of the measuring means. Means are preferably provided for monitoring the loading of the belt to provide control signals to the electrical circuit arrangement indicative of an unloaded condition.

The electrical circuit arrangement may comprise a microprocessor programmed to monitor the calibration during lifting of the belt and to subtract the effective mass of the belt from measurements made by the measuring means during loaded operation of the weighbelt apparatus.

BRIEF DESCRIPTION OF THE DRAWINGS

A weighbelt apparatus according to the invention will now be described by way of example with reference to the accompanying diagrammatic drawings in which:

FIG. 1 shows an elevation view of the apparatus; and

FIG. 2 shows an isometric view of the apparatus with a belt of the apparatus partly cut away.

DESCRIPTION OF A PREFERRED EMBODIMENT

Referring to the drawings, a belt 10 is supported between two main rollers 12 and 14 and is driven in use over and is supported by a generally planar support plate 16. A number of auxiliary rollers 18 are mounted on a frame 20 which are arranged below the belt 16. The rollers 18 are lifted by the frame 20 as required, as explained below, to raise the belt 10 out of contact with the plate 16.

The plate 16 is supported at each end and a strain gauge 22 is secured to the plate 16 from which can be derived signals to determine the force applied to the plate 16 by the belt 10. A fixed mass 24 which can be raised and lowered from and into a cradle 26 mounted under the plate 16.

An electrical circuit arrangement (not shown) including a microprocessor is provided and connected to monitor signals derived from the strain gauge 22. The circuit arrangement controls the raising and lowering of the frame 20 and of the mass 24. The function between mass load position with relation to material on the belt 10 has to be established. This will be a fixed relationship for a particular mounting position of cradle 26.

In order to calibrate the apparatus, the frame 20 is raised, a zero reading is taken then the mass 24, say two kilograms, is lowered into the cradle 26 and another reading is taken. These readings (signals) derived from the strain gauge 22 provide a calibration function for the apparatus. The frame 20 is then lowered and the mass 24 is raised out of the cradle 26. Signals derived from the strain gauge 22 are then equivalent as just calibrated to the unloaded mass of the belt. This measurement is stored in the microprocessor and represents the mass of the belt in an unloaded condition which must be substracted in order to determine the mass of any material on the belt during loaded operation of the apparatus.

In use, the weighbelt apparatus is used in a production line for supplying materials to be mixed into a product. The amount of material passing over the weighbelt is determined by the function of belt speed and mass measured by the belt at any instant. It has been explained above how the weighbelt apparatus is used to determine that mass. The mass is measured by monitoring signals derived from the strain gauge 22. The derived signals are calibrated as described using the fixed mass 24 and the actual mass at any time is determined by substracting the belt weight from the weight obtained by applying the calibration function together with the function between mass load position, with relation to material on belt.

A particular advantage of the described apparatus and especially when using an automatic electrical control system is that the calibration of the apparatus can be continually up-dated. This is achieved by raising the rollers and lowering the fixed weight 24 into the cradle 26 without disrupting the operation of the weighbelt apparatus. Likewise, at times when the belt is unloaded an up-date measurement can be made of the mass of the belt and stored in the microprocessor until the next up-date. A suitable monitoring device such as an electric eye can be provided for providing signals to the electrical circuit arrangement indicative of an unloaded condition. The signals of the monitoring device are checked by the microprocessor before any up-date measurement of the mass of the belt is carried out.

The described apparatus is therefore more accurate than other apparatus in which the calibration alters because the apparatus is continuously re-calibrated and interuptions in production are not required.

It will be noted that whereas strain gauges have been described other devices may be used for determining the forces applied to the support 16. Other mechanical arrangements of the apparatus are possible in which the belt can be lifted and a known force, such as the mass 24, applied to provide calibration as required. In each case, the apparatuses are arranged so that the known force can be applied without interupting the operation of the apparatus, that is the running of the belt, to enable re-calibration at suitable or regular intervals.

I claim:

1. A weighbelt apparatus having a belt upon which material is moved across the apparatus, a generally planar support for the belt extending across the apparatus, belt lifting means connected to the apparatus arranged to lift the belt out of contact with the planar support during operation of the apparatus, means arranged to apply a known downward force to the planar support, measuring means attached to the planar support arranged to provide output signals corresponding to a downward force exerted by the planar support at any time, control means to co-ordinate and control the belt lifting means, the means to apply the known downward force and to select three sets of signals provided by the measuring means:
   (a) first signals arising when the belt is lifted out of contact with the planar support and no external downward force is applied to the planar support;
   (b) second signals arising when the belt is lifted out of contact with the planar support and the known downward force is applied to the planar support; and
   (c) third signals arising when the belt is in contact with the planar support and the known downward force has been removed from the planar support, and means for processing the first and second signals to provide calibration values and the third signals with the calibration values to provide a measure of the mass carried by the belt.

2. A weighbelt apparatus according to claim 1, including means to monitor the loading of the belt and to provide signals indicative of an unloaded condition, an electrical circuit arrangement arranged to respond to the output signals and to the signals indicative of an unloaded condition, to store the output signals and to substract the value of those signals from output signals provided during a loaded condition of the belt.

3. A weighbelt apparatus according to claim 1, including a microprocessor which receives the output signals and is programmed to control and coordinate the belt lifting means and the means to apply the known downward force.

4. A weighbelt according to claim 2, in which the electrical circuit arrangement comprises a microprocessor.

5. A weighbelt according to claim 1, in which the planar support has a plurality of apertures therein, and a framework is provided which forms part of the lifting means, auxiliary rollers are mounted on the framework and extend into respective of the apertures to lift the belt off the planar support when the framework is raised.

6. A weighbelt according to claim 1 including a cradle, fixed to an underside of the planar support, into which the known weight can be lowered to apply the known downward force.

7. A weighbelt apparatus according to claim 1, in which the measuring means comprises a strain gauge fixed to the planar support.

8. A weighbelt apparatus comprising a frame on which rollers are mounted at each side, a belt extending between the two rollers and upon which material is transported in use across the apparatus to be weighed by the apparatus, a generally planar support for the belt mounted on the frame between the rollers, a strain gauge fixed to the planar support to provide output signals corresponding to the downward force applied to the planar support, the planar support having a plurality of apertures therein, a framework positioned below the planar support and having mounted thereon a plurality of auxiliary rollers which extend into the respective of the apertures to raise the belt off the planar support whenever the framework is raised, means for raising the framework, a cradle fixed to and under the planar support, and means for lowering and raising a known value mass into and out of the cradle such that the output signals generated when the belt is raised can be used to calibrate the output signals by applying a known force provided by the known mass when it is lowered into the cradle without interrupting the movement of the belt and the through flow of material carried by the belt during operation of the apparatus.

9. The apparatus according to claim 1 including means to monitor the loading of the belt and to provide fourth signals indicative of an unloaded condition, an electrical circuit arrangement arranged to respond to the fourth signals to store the third signals and to subtract the value of the stored third signals from third signals provided during a loaded condition of the belt.

10. The apparatus according to claim 9, in which the control means and the processing means is a microprocessor.

11. The apparatus according to claim 9 in which the measuring means comprises one or more strain guages fixed to the planar support.

12. The apparatus according to claim 1, in which the control means and the processing means is a microprocessor.

13. A method of determining the mass of material moved across a weighbelt apparatus comprising a support for the moving belt, belt lifting means for lifting the belt out of contact with the support, means arranged to apply a known downward force to the support and measuring means attached to the support arranged to provide signals corresponding to the downward force exerted by the support at any time, comprising selecting three sets of signals provided by the measuring means:
   a set of first signals arising when the belt is lifted out of contact with the support and no external downward force is applied to the support;
   a set of second signals arising when the belt is lifted out of contact with the support and the known downward force is applied to the support; and
   a set of third signals arising when the belt is in contact with the support and the known downward force is absent;
   and processing the first and second signals to provide calibration values and the third signals with the calibration values to provide measure of the mass of material carried by the belt.

14. The method claimed in claim 13 including the step of monitoring the loading of the belt, storing the third set of signals when the belt is unloaded and in the processing of the signals subtracting the value of the stored signals from the value of the third signals arising when the belt is loaded.

* * * * *